July 29, 1969     F. G. ANDRIUSSI ET AL     3,458,122
VENTILATING DEVICE FOR COOLING A HEAT ENGINE
Filed June 22, 1967                                                          3 Sheets-Sheet 1
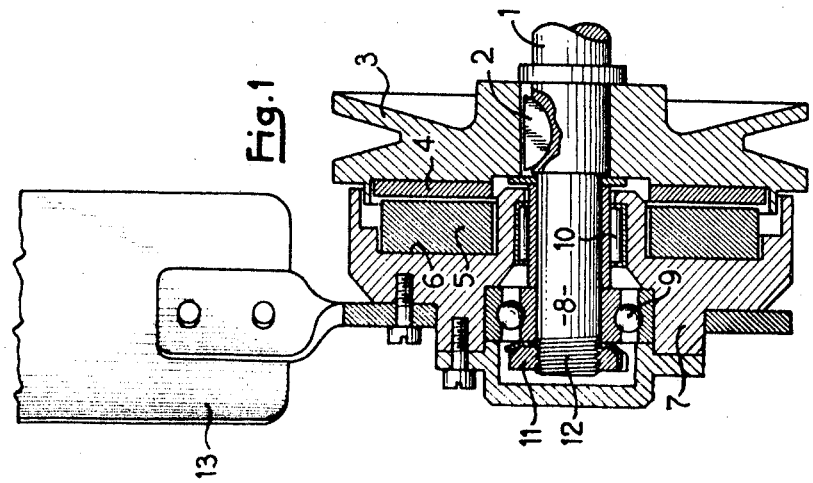
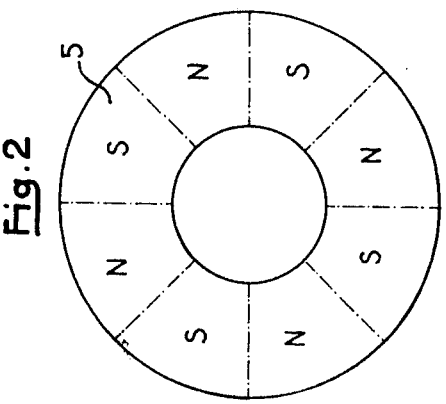
*Inventors:*
François Andriussi
Pierre Rouques
by    *May Wall*
       Attorney

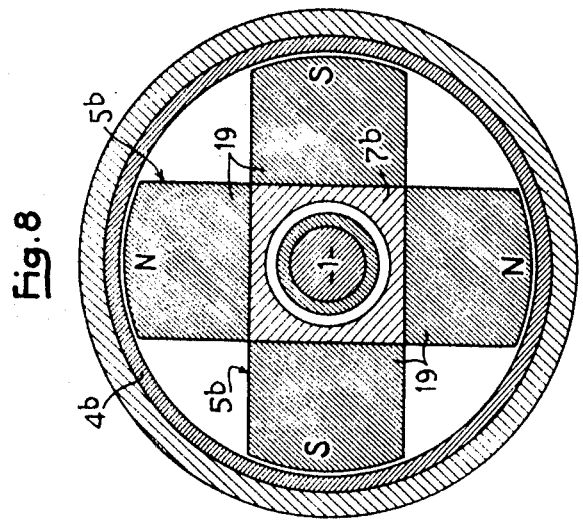
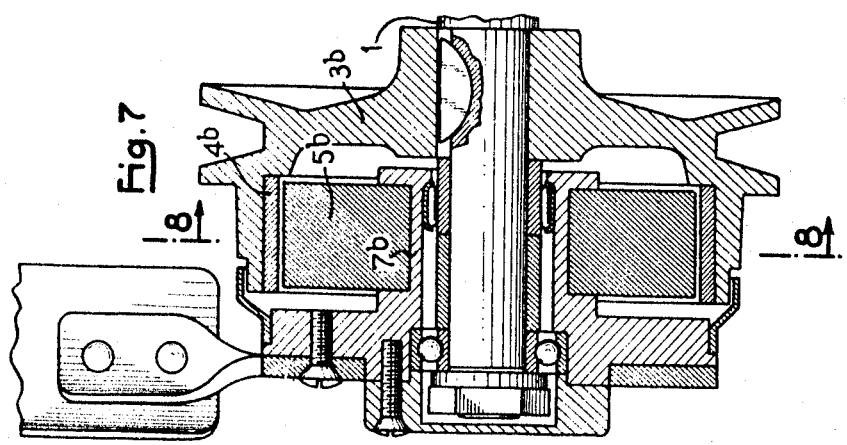
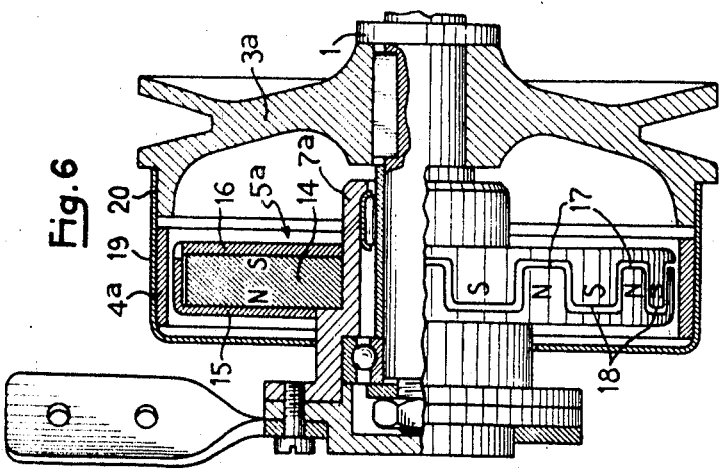

United States Patent Office 3,458,122
Patented July 29, 1969

3,458,122
**VENTILATING DEVICE FOR COOLING
A HEAT ENGINE**
Francois G. Andriussi and Pierre A. Rouques, Grenoble,
France, assignors to Eurotechni Office Europeen
d'Etudes et de Realisations Techniques, Grenoble, and
S.E.R.M.A.G. Societe d'Etudes et de Recherches
Magnetiques, Saint Martin d'Heres, France, both French
body corporates
Filed June 22, 1967, Ser. No. 648,117
Claims priority, application France, June 27, 1966,
67,012
Int. Cl. F04d 25/08; H02k 49/04
U.S. Cl. 230—270                                    8 Claims

ABSTRACT OF THE DISCLOSURE

A ventilating device for cooling a heat engine, comprising in combination with a driven fan rotor and with a coaxial driving shaft adapted to be driven by the engine to be cooled, two magnetic elements which are associated with each other without mechanical contact, one of these elements being an inductor and the other an induced element which also has the properties of a permanent magnet, the induced element having such shape and dimensions that it is subjected to the magnetization of the inductor.

---

The present invention relates to the cooling of heat engines.

It is known that the cooling of a heat engine requires the production of a stream of atmospheric air directed either directly onto the engine (resulting in an air-cooled engine) or onto a heat exchanger or radiator (resulting in a liquid-cooled engine).

If it is desired that the operating temperature of the engine remain roughly constant at all speeds, the flow of cooling air must be proportional to the heat losses of the engine.

In the particular case of a vehicle, the flow of air is produced, firstly, by the speed at which the vehicle travels and, secondly, by the additional supply of air from a fan.

It will be recalled that at low speeds (slow running and very low speeds), the heat efficiency of the engine drops considerably and this increases the percentage of heat discharged by the cooling system.

The areas of heat exchange (fins or tubes of the radiator) are defined by an economical compromise. In any case, the natural ventilation due to the travelling of the vehicle is in practice sufficient at high speeds. On the other hand, the additional supply of cooling air from the fan is necessary at low speeds and when the vehicle is stationary with the engine running.

Consequently, fans dimensioned for good operation under these conditions are always excessive at high speeds. The power for driving the fan—which varies on the whole as the cube of the speed of rotation—is then considerable (several kilowatts) and entirely lost. Moreover, the noise of operation of the fan becomes excessive.

Several arrangements are known whose principle consists in stopping the fan by uncoupling or stopping the independent driving motor thereof, each time fan operation is unnecessary. For this purpose, a thermostat measures the temperature of the cooling water and brings the fan into action only beyond a given temperature.

These devices are therefore necessarily applied only to liquid-cooled engines.

The object of the invention is to provide a ventilating device for the cooling of a heat engine, this device being adapted for the requirements of good operation of the engine and being applicable to all cooling methods without useless loss of power.

The device according to the invention comprises, in combination with a driven fan rotor and a generally coaxial driving shaft driven by the engine to be cooled, two magnetic elements associated without mechanical contact, one of said elements being integral with the driving shaft and the other with the driven rotor, one of said elements constituting an inductor and the other element an induced element or armature which also has the property of a permanent magnet and is of such shape and size that it is subjected to the magnetization of the inductor.

In this device, the fan is therefore driven in rotation by the engine at the end of the crankshaft, on the camshaft or on the waterpump etc., but there is no positive mechanical connection between the rotating element of the engine and the fan rotor. The drive is achieved by magnetic means, the principle of operation of which is known under the expression "hysteresis drive," namely with an automatic slip beyond a maximum transmissible torque.

The inductor is preferably multipolar and either electromagnetic or preferably has a permanent magnet.

As concerns the armature, it is of a permanent magnet material preferably of the type of those generally known as "hysteretic alloys" in which iron can receive isolated or combined additions of carbon, chromium, tungsten, cobalt etc., or of the nickel-aluminium-iron type. The dimensions and magnetic properties of the armature are so arranged that the armature is subjected to the magnetization of the inductor.

By way of example, there may be mentioned an alloy having a coercive field of 14,400 ampere-turns/min. which is perfectly suitable associated with a barium-ferrite inductor Further features and advantages of the invention will be apparent from the ensuing description with reference to the accompanying drawing.

In the drawings:

FIG. 1 is a longitudinal diametral sectional view of a ventilating device according to the invention;

FIG. 2 is a front elevational view of the magnet-inductor;

FIG. 6 is a half axial sectional view and a half elevational view of a modification of the ventilating device according to the invention;

FIG. 7 is a diametral axial sectional view of another modification, and

FIG. 8 is a section view taken on line 8—8 of FIG. 7.

Figure 5:
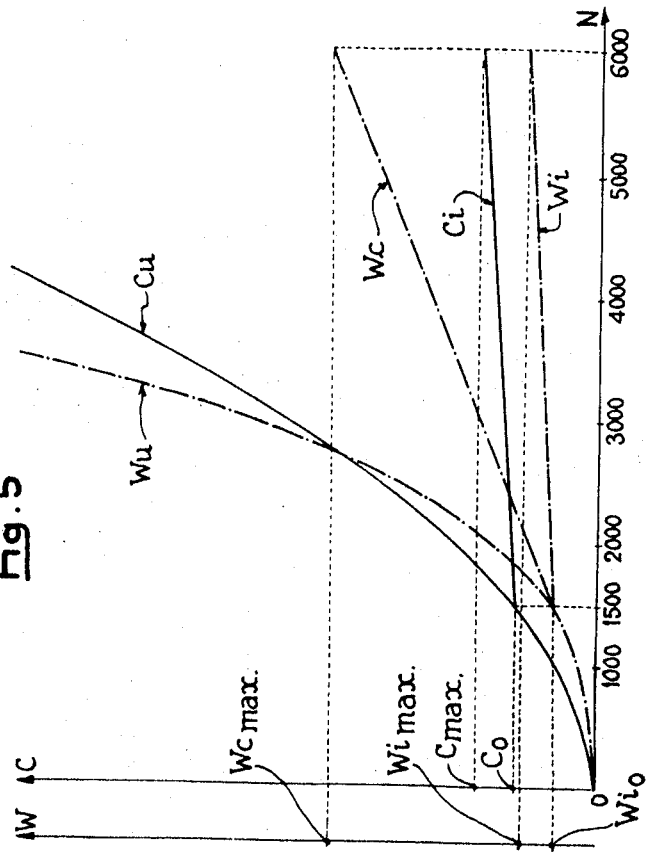
FIG. 5 is a graph showing, as a function of the speed N of the driving part in r.p.m. plotted as abscissae, on one hand the values of various powers W and, on the other hand, various torques C mentioned hereinafter and plotted as ordinates.

In the embodiment shown in FIG. 1, keyed at 2, on the end of an overhanging rotary shaft 1 is a pulley 3 which is connected to a driving shaft. Fixed against the pulley by adhesion and/or screws is a plate 4 forming a driving armature composed of a hysteretic alloy, for example cobalt steel.

This plate or disc 4 constitutes the driving element of the hysteresis drive. The driven element consists of a ring shaped inductor magnet 5 having north poles (N) and south poles (S) (see FIG. 2) which are in alternating relation to each other on the plane face facing the driving disc 4. This driven magnet is secured in an annular recess 6 in the rotor 7 of a fan by adhesion.

The rotor 7 is mounted on a smooth bearing face 8 of the driving shaft 1 by means of a ball or roller bearing 9 and a needle bearing 10, the latter being located roughly in the same plane as the magnet 5. Owing to the small overall size of such a bearing 10, the magnet 5 can have a large surface area despite a relatively small outside diameter, that is, small overall size.

The rotor 7 is held in position by a nut 11 screwed on the screwthreaded end 12 of the shaft 1 and carries the usual blades 13.

The ventilating device operates in the following manner:

The driving magnet 4 is magnetized by the presence of the field of the driven inductor 5. The system is therefore comparable to a synchronous magnetic transmission and can develop a certain torque $Co$ which depends on the construction, that is, on the nature and sizes of the elements 4 and 5.

However, in contradistinction to what occurs in a synchronous magnetic coupling, a slip can occur when the torque required tends to exceed the value $Co$. Each zone of the driving armature 4 is magnetized alternately in one direction and then the other and thus passes through a hysteresis cycle. It can be easily shown that the torque transmitted is then constant and independent of the slip speed. Strictly speaking, in practice it increases slightly with the slip owing to the eddy currents created.

Figure 3:
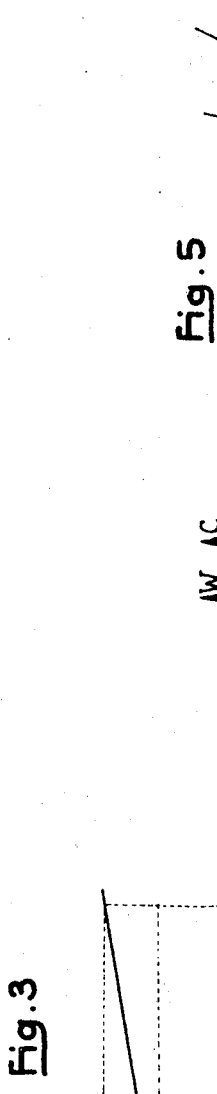
FIG. 3 is a graph showing, as a function of the slip in r.p.m. plotted as abscissae, the torque transmitted $C_i$ plotted as ordinates.
Figure 4:
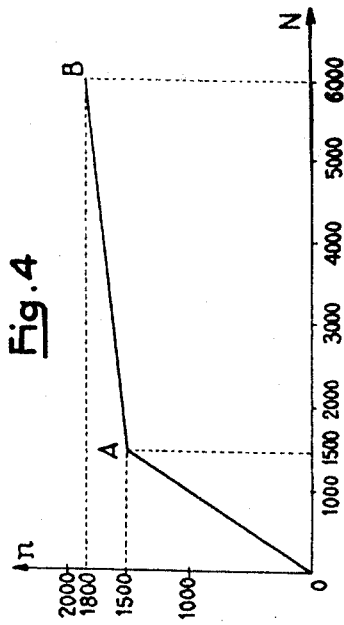
FIG. 4 is another graph showing, as a function of the speed N of the driving part in r.p.m. plotted as abscissae, the speed $n$ of the fan plotted as ordinates.

FIG. 3 shows the variation of the torque $Ci$ transmitted as a function of the slip. As concerns the speed of rotation $n$ of the fan, it is equal to the speed N of rotation of the driving part so long as there is no slip for example up to 1,500 r.p.m. (part OA of FIG. 4) and then very slowly increases at AB owing to the eddy currents.

FIG. 5 shows, as a function of the speed N of the motor, at:

$Cu$—The torque required for driving a normal fan keyed on the shaft therefor.
$Ci$—The torque required in accordance with the invention, owing to the hysteresis drive.
$Wu$—The power required by a normal fan keyed on the shaft therefor.
$Wi$—The power required in accordance with the invention.
$Wc$—The total power consumed.

It will be observed that:

$Ci$ is much less than $Cu$.
$Wi$ is also less than $Wc$.

By way of illustration, an example of application will now be given.

Assume that a correctly designed fan which is efficient at low operational speeds and whose characteristic torque curve C and characteristic power curve W are those shown in FIG. 5, is employed.

At the maximum operational speed, say 6000 r.p.m. the power $Wu$ consumed by the normal fan keyed on its shaft is 3700 watts, the driving torque at this speed being 5.9 Newton-meters.

According to the invention, it is desired to drive this fan in a synchronous manner up to 1500 r.p.m. then, thereafter, to limit this speed so that it remains less than 2000 r.p.m.

At 1500 r.p.m. the driving torque is:

$$Co = 0.37 \text{ Newton-meter}$$

The power consumed is:

$$Wo = 57 \text{ watts}$$

The coupling is so dimensioned that the "disengaging" torque $Co$ is equal to 0.37 Newton-meter.

In the case of the arrangement shown in FIG. 1, this result is obtained by means of an inductor magnet 5 of magnetized barium ferrite comprising eight poles having the following composition $BaO, 6Fe_2O_3$ and:

| | Mm. |
|---|---|
| Outside diameter | 72 |
| Inside diameter | 30 |
| Thickness | 10 |

The plate 4 which forms the driving armature of cobalt steel has the same diameters and a thickness of 2.5 mm. Its composition is for example the following:

| | Percent |
|---|---|
| Carbon | 0.9 |
| Cobalt | 15 |
| Chromium | 5 |

The airgap, determined by tests, is adjusted at 1 mm.

With this arrangement, the coupling is "locked" for all torques less than 0.37 Newton-meter, namely for all rotational speeds less than 1500 r.p.m.

For higher operational speeds, the torque $Ci$ transmitted follows the curve shown in FIG. 5. At 6,000 r.p.m. this torque is:

$$C \text{ max.} = 0.53 \text{ Newton-meter}$$

which corresponds to a speed of rotation of the fan of about 1,800 r.p.m. (see FIG. 4).

The power supplied to the fan is then (FIG. 5):

$$Wi \text{ max.} = 100 \text{ watts.}$$

The power lost ($W_p$) in the coupling is:

$$W_p = 0.53 \times (6,000 - 1800) \times \frac{\pi}{30} = 233 \text{ watts}$$

The power consumed is therefore:

$W_c$ max.$= 333$ watts, namely only 9% of the power which the same fan, keyed on its shaft, would have required.

In conclusion, experiments have shown that this type of fan drive perfectly ensures a good operation of the engine.

In service, there is observed a reduction in the power taken from the engine which may reach about 3,400 watts at maximum speed, which, for the engine under consideration, represents 6–4% of the total power. This recovered power is of course entirely free.

The advantage as concerns silence is also considerable since the reduction in speed from 6,000 to 1,800 r.p.m. has an effect on both the acoustic power and the frequency of the emitted sound.

FIG. 6 shows a modification of the device according to the invention, in which the inductor magnet $5^a$ is composite, its magnetization being axial, one face being North and the other South. The annular core 14 of this magnet is equipped with two polar masses 15 and 16 having interpenetrating teeth 17 and 18 on the outer face as shown. In this assembly, the teeth art alternately North and South.

The complementary hysteretic member $4^a$ forming the driving armature thus has the shape of a ring coaxial with the inductor magnet $5^a$ and the magnetic forces are transferred to the outer peripheral face of the magnet.

The magnet $5^a$ is integral with the hub $7^a$ of the rotor of the fan as concerns rotation whereas the member $4^a$ is integral with the driving shaft 1 since it is an interference fit in a cup 19 attached to a shoulder 20 of the pulley $3^a$ keyed on the shaft 1.

In another modification shown in FIGS. 7 and 8, the driven inductor magnet $5^b$ cooperating with the driving armature $4^b$ is a cross-shaped, the ends of the cross having a polarity alternately North and South. The operation is identical to that of the device shown in FIG. 6. The construction employs four prismatic magnets 19 fixed to a centre soft-iron core constituting a hub $7^b$ of the rotor of the fan.

Although specific embodiments of the invention have been described, many modifications and changes may be made therein without departing from the scope of the invention as defined in the appended claims.

Thus the positions of the armature and the inductor can be changed round. The inductor can be a driving member and the armature a driven member.

Having now described our invention what we claim as new and desire to secure by Letters Patent is:

1. A ventilating device for cooling a heat engine, said device comprising in combination a driven fan rotor and a coaxial driving shaft adapted to be driven by the engine to be cooled, a coupling including two magnetic elements associated with each other without mechanical contact, said elements being fixed to the driving shaft and to the driven rotor respectively and constituting an inductor element, and an induced element, the latter being of a ferromagnetic permanent magnet material and subjected to the magnetization of the inductor element, said inductor element having at least two complementary poles, thereby to permit an hysteretic slip coupling drive of said driven fan rotor with said driving shaft beyond a maximal predetermined torque.

2. A device as claimed in claim 1, wherein the inductor element is multipolar.

3. A device as claimed in claim 1, wherein the inductor element comprises a permanent magnet.

4. A device as claimed in claim 1, wherein the induced element is a driving element and the inductor element a driven element.

5. A device as claimed in claim 1, wherein the induced element is a driven element and the inductor element a driving element.

6. A device as claimed in claim 1, wherein the induced element and the inductor element have a slight airgap therebetween, the inductor element comprising North and South poles in alternating relation in the circumferential direction.

7. A device as claimed in claim 1, wherein the induced element is a ring in which the inductor element is located, the inductor element having alternating peripheral poles.

8. A device as claimed in claim 1, comprising a driving pulley, the driving element which drives by hysteresis, being mounted in a cavity in the driving pulley, and the driven element being mounted in a cavity of the rotor of the fan.

References Cited

UNITED STATES PATENTS

| | | | |
|---|---|---|---|
| 2,436,072 | 2/1948 | Matulaitis | 310—105 |
| 2,519,449 | 8/1950 | Findley | 310—105 X |
| 2,680,203 | 6/1954 | Zozulin et al. | 310—105 X |
| 3,085,407 | 4/1963 | Tomlinson | 64—6 |
| 3,365,598 | 1/1968 | Jaeschke | 310—105 |
| 3,382,385 | 5/1968 | Baudot | 310—105 X |

LEONARD H. GERIN, Primary Examiner

U.S. Cl. X.R.

64—6; 310—105